United States Patent [19]

Clegg

[11] Patent Number: 4,609,250

[45] Date of Patent: Sep. 2, 1986

[54] PRISMATIC ENLARGER-REDUCER

[76] Inventor: John E. Clegg, 2320 Keystone Dr., Orlando, Fla. 32806

[21] Appl. No.: 644,379

[22] Filed: Aug. 27, 1984

[51] Int. Cl.⁴ .............................................. G02B 5/04
[52] U.S. Cl. .................................. 350/6.4; 350/286; 350/421
[58] Field of Search ............... 350/6.2, 6.4, 6.5, 286, 350/355, 421, 433, 436, 484, 500–504

[56] References Cited

U.S. PATENT DOCUMENTS

| 2,405,960 | 8/1946 | Land. | |
|---|---|---|---|
| 3,576,357 | 4/1971 | Levy | 350/433 |
| 3,884,548 | 5/1975 | Linder | 350/286 |
| 4,136,926 | 1/1979 | Sigler | 350/504 |

FOREIGN PATENT DOCUMENTS 119260  9/1979  Japan.

OTHER PUBLICATIONS

Optical Engineering, Jul./Aug. 1974, vol. 13, No. 4.
Xerox Disclosure Journal, vol. 6, No. 5, Sep.—Oct., 1981.

Primary Examiner—John K. Corbin
Assistant Examiner—Loha Ben

[57] ABSTRACT

Two single-refraction prisms which produce enlarged or reduced images in two dimensions. The prisms have cylindrical members which can be revolved so as to emit the refracted beams without additional refraction. The first prism enlarges the image in the vertical dimension, and the second prism enlarges the image in the horizontal dimension.

1 Claim, 4 Drawing Figures

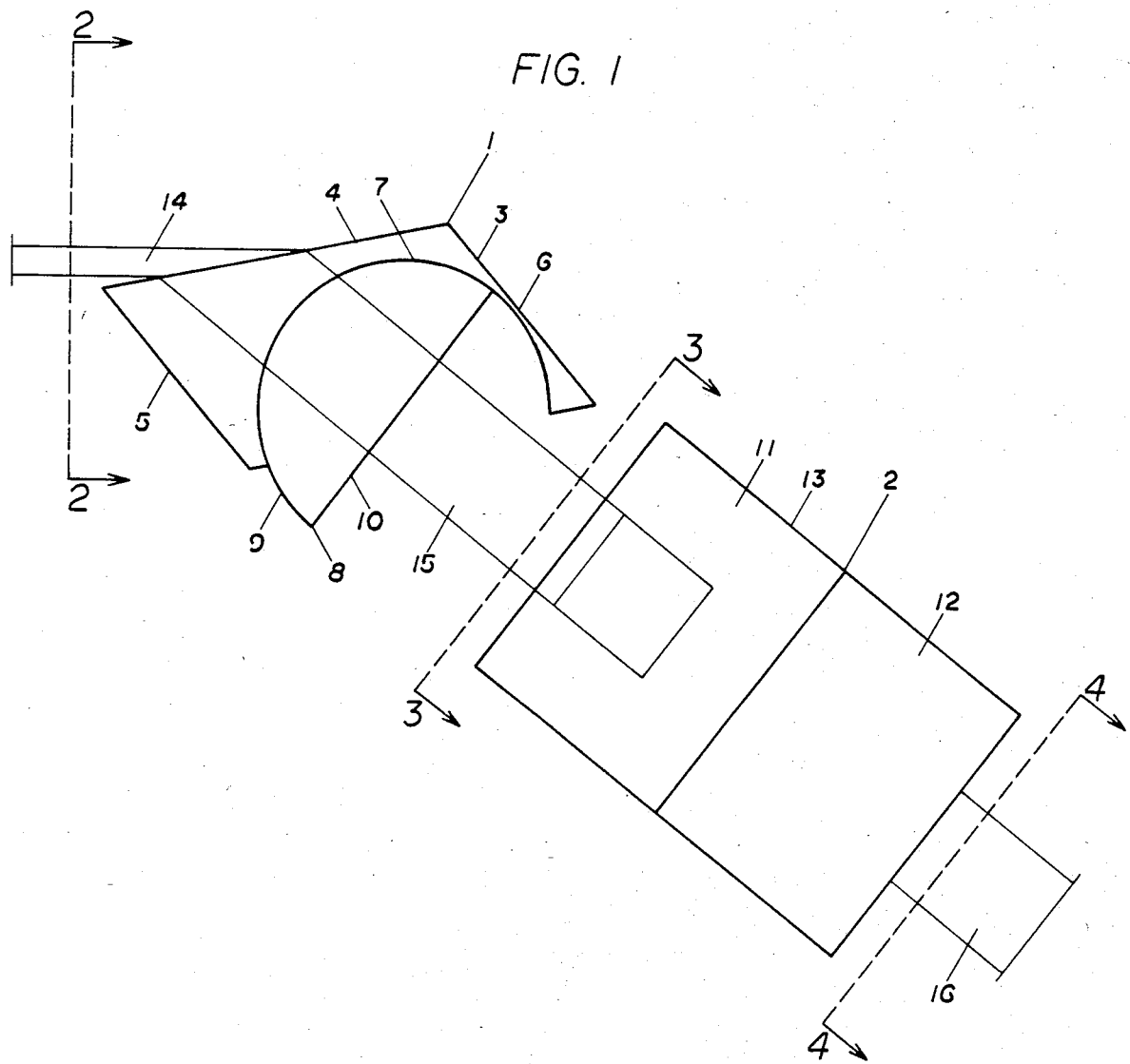
FIG. 1
FIG. 2
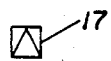
FIG. 3
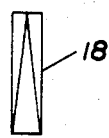
FIG. 4
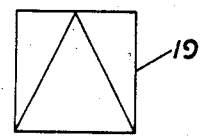

PRISMATIC ENLARGER-REDUCER

BACKGROUND

Prior art includes prisms with fixed integral faces. Concurrent art includes the Single-Refraction Prism, the Revolving Mirror Prism and the Planar-Spherical Prism which are being filed concurrently with the subject disclosure. Each of these prisms has revolving members.

DRAWINGS

FIG. 1 is an elevation of the prismatic enlarger-reducer with the first prism shown in side view and the second prism shown in top view.

FIG. 2 is a cross section taken on line 2—2 of FIG. 1.
FIG. 3 is a cross section taken on line 3—3 of FIG. 1.
FIG. 4 is a cross section taken on line 4—4 of FIG. 1.

DESCRIPTION

FIG. 1 shows the prismatic enlarger-reducer comprising single-refraction prism 1 viewed from the side and single-refraction prism 2 viewed from the top. Prisms 1 and 2 are identical. Prism 1 enlarges the beam in the vertical dimenson, and prism 2 enlarges the beam in the horizontal dimension. Prism 2 is revolved 90° counterclockwise from prism 1, with the axis of revolution being the centerline of the second refracted beam.

Prism 1 has two members. Angular member 3 has an angular face 4 inclined 60° from base 5 and 120° from top 6 and a concave cylindrical face 7 opposite face 4. Cylindrical member 8 is a longitudinal half-cylinder mounted inside angular member 3, with a convex cylindrical face 9 adjoining concave cylindrical face 7 and a longitudinal planar face 10 opposite face 9.

Prism 2 has identical members and faces. Only angular face 11 and top 12 of angular member 13 are exposed to view in the drawing.

Prism 1 is positioned to place angular face 4 at an angle to incident beam 14, which is refracted and enlarged in the vertical dimension. Cylindrical member 8 is revolved to place planar face 10 perpendicular to first refracted beam 15, which is emitted without refraction and reduction in width.

Prism 2 is revolved to place angular face 11 at the same angle to first refracted beam 15 as the angle between angular face 4 and incident beam 14. First refracted beam 15 is refracted by angular face 11 and enlarged in the horizontal dimension producing second refracted beam 16. The cylindrical member (not shown) of prism 2 is revolved to place longitudinal planar face (not shown) perpendicular to second refracted beam 16, which is emitted without refraction and reduction in width.

In the drawings incident beam 14 and first refracted beam 15 are parallel to the page, and second refracted beam 16 is inclined into the page.

The object is an isosceles triangle enclosed in a square as shown in image 17 in FIG. 2. The image 18 of the first refracted beam 15 is shown in FIG. 3. The image 19 of the second refracted beam 16 is shown in FIG. 4.

The vertical and horizontal dimensions of the image can be changed by revolving the cylindrical members of the prisms so as to reduce the width of the refracted beams.

I claim:

1. A prismatic enlarger-reducer comprising in general a sngle-refraction prism which magnifies an incident beam in one dimension and an identical single-refraction prism revolved 90° from the first prism so as to magnify the beam in the other dimension, and comprising in particular;

a single-refraction prism (1) comprising an angular member (3) having an angular face (4) inclined 60° from the base (5) and 120° from the top (6) and having a concave cylindrical face (7) opposite said angular face (4), and comprising a revolving cylindrical member (8) mounted inside said angular member (3) and having a convex cylindrical face (9) adjoining said concave cylindrical face (7) and having a longitudinal planar face (10) opposite said convex cylindrical face (9), and an identical single-refraction prism (2) revolved 90° from the position of said single-refraction prism (1) on an axis occupying the centerline of refracted beam (16) and comprising an angular member (13) having an angular face (11) inclined 60° from the base and 120° from the top and having a concave cylindrical face opposite said angular face (11), and comprising a revolving cylindrical member mounted inside said angular member (13) and having a face identical to said convex cylindrical face (9) of said single-refraction prism (1) and having a face identical to said longitudinal planar face (10) of said single-refraction prism (1).

* * * * *